United States Patent
Jamali et al.

(10) Patent No.: US 11,561,437 B2
(45) Date of Patent: Jan. 24, 2023

(54) BROADBAND AND WIDE VIEWING ANGLE WAVEPLATE HAVING PI-CELL

(71) Applicant: Meta Platforms Technologies, LLC, Menlo Park, CA (US)

(72) Inventors: Afsoon Jamali, Redmond, WA (US); Yingfei Jiang, Sarasota, FL (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 84 days.

(21) Appl. No.: 17/163,414

(22) Filed: Jan. 30, 2021

(65) Prior Publication Data

US 2021/0181557 A1 Jun. 17, 2021

Related U.S. Application Data

(63) Continuation of application No. 16/826,861, filed on Mar. 23, 2020, now Pat. No. 10,948,779.

(60) Provisional application No. 62/833,410, filed on Apr. 12, 2019.

(51) Int. Cl.
G02F 1/13363 (2006.01)

(52) U.S. Cl.
CPC ...... *G02F 1/13363* (2013.01); *G02F 2413/03* (2013.01); *G02F 2413/07* (2013.01); *G02F 2413/12* (2013.01); *G02F 2413/13* (2013.01); *G02F 2413/14* (2013.01)

(58) Field of Classification Search
CPC ............. G02F 1/13363; G02F 2413/03; G02F 2413/12; G02F 2413/13; G02F 2413/14
See application file for complete search history.

(56) References Cited

U.S. PATENT DOCUMENTS

| | | | |
|---|---|---|---|
| 2003/0193637 A1 | 10/2003 | Mi et al. | |
| 2007/0024792 A1* | 2/2007 | Chang | G02F 1/134363 |
| | | | 349/141 |
| 2009/0002609 A1 | 1/2009 | Okita et al. | |
| 2009/0066899 A1 | 3/2009 | Okita et al. | |
| 2012/0257125 A1 | 10/2012 | Okita et al. | |

OTHER PUBLICATIONS

International Search Report and Written Opinion issued in PCT Application No. PCT/US2020/027416, dated Jun. 9, 2020 (15 pages).
Miyashita et al., "Optically Compensated Bend Mode (OCB Mode) with Wide Viewing Angle and Fast Response," IEICE Transactions on Electronics, vol. E79-C, No. 8, Aug. 1996 (7 pages).
Miyashita T., et al., "Wide-viewing-angle display mode for active-matrix LCDs using a bend-alignment liquid-crystal cell," Journal of the Society for Information Display, 3(1), Jul. 1995, pp. 29-34 (6 pages).
Tanaka, Y., et al., "Fast-Response and High-Contrast OCB LCD with LED Backlight," Information and Media Technologies, 2008, 3(1), pp. 7-12, reprinted from: The Journal of the Institute of Image Information and Television Engineers 61(9): pp. 1333-1338 (2007) (6 pages).

* cited by examiner

Primary Examiner — James A Dudek
(74) Attorney, Agent, or Firm — Millburn IP PLLC

(57) ABSTRACT

An optical element is provided. The optical element includes a positive-C film including a liquid crystal ("LC") layer. The optical element also includes a positive-A film. The optical element also includes a negative biaxial retardation film disposed between the positive-A film and the positive-C film.

20 Claims, 15 Drawing Sheets

100

| 101 |
|---|
| 102 |
| 103 |
| 104 |

BROADBAND AND WIDE VIEWING ANGLE WAVEPLATE HAVING PI-CELL

CROSS-REFERENCE TO RELATED APPLICATIONS

This application is a continuation of U.S. Non-provisional patent application Ser. No. 16/826,861, filed on Mar. 23, 2020, which claims the benefit of U.S. Provisional Patent Application No. 62/833,410, filed on Apr. 12, 2019. Contents of the above-mentioned applications are incorporated herein by reference in their entirety.

BACKGROUND

Waveplates have been implemented in many instruments and optical systems for polarization control. A waveplate controls the polarization by retarding (or delaying) a component of polarization (or a polarization component) with respect to an orthogonal component. Retardance is a phase shift (hence "retardance" may also be referred to as "phase retardance") between the polarization component projected along a fast axis and the orthogonal component projected along a slow axis. Waveplates utilizing tunable birefringent materials, e.g., liquid crystal ("LC") waveplates, have the advantage of non-mechanically tuning of the retardance.

SUMMARY OF THE DISCLOSURE

One aspect of the present disclosure provides an optical element. The optical element includes a positive-C film including a liquid crystal ("LC") layer. The optical element also includes a positive-A film. The optical element also includes a negative biaxial retardation film disposed between the positive-A film and the positive-C film.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1:
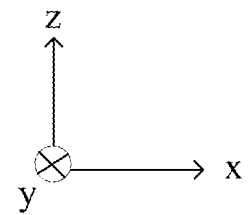
FIG. 1 illustrates a schematic diagram of an optical waveplate according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claim.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

For polarimetric imaging systems, it is highly desirable that LC waveplates have broadband performance to cover wavelengths ranging from visible ("VIS") to near infrared ("NIR") regions, a large acceptance angle (i.e., large incident angle), a low residual retardance, a fast response, and a capability of being switched between different states, for example, between a substantially zero retardance and a non-zero retardance value (e.g. half-wave retardance, quarter-wave retardance). It may be a challenge to obtain the above-mentioned advantages in LC waveplates using twisted nematic liquid crystal ("TNLC") cells at the same time. For example, the response time of a typical nematic LC waveplate is about 5 milliseconds ("ms"), and the residual retardance is large because nematic LC molecules may not be completely reoriented along an external electric field. Compared to TNLC cells, an LC cell including an LC layer aligned in an optically compensated bend ("OCB") mode, also referred to as a Pi-cell, exhibits fast switching speed (about 2 ms) and naturally wide viewing angles due to a parallel alignment of LC molecules. In addition, a high contrast may be achieved with a compensation film to subtract residual birefringence at substrate surfaces. Thus, Pi-cells may be used to form broadband LC waveplates with a fast response and a wide viewing angle.

The present disclosure provides an optical waveplate having broadband performance that covers wavelengths ranging from visible ("VIS") to near infrared ("NIR") regions, a large acceptance angle (e.g., suitable for a large incident angle), a low residual retardance, a fast response, and a capability of being switchable between states of different phase retardances, such as between a substantially zero retardance (or an equivalent full-wave retardance, e.g., one full-wave retardance, two full-wave retardance, etc.) and a non-zero fractional-wave retardance (e.g. half-wave retardance, quarter-wave retardance). The optical waveplate may include a liquid crystal ("LC") cell including a nematic LC layer aligned in an optically compensated bend ("OCB") mode, a positive-C film, a negative biaxial retardation film, and a positive-A film arranged in an optical series. The LC cell may be controllable by an external electric field to switch between at least two predetermined states, which include a splay state and a homeotropic state. In some embodiments, the LC cell and the positive-A film may be disposed at two opposite sides of the positive-C film, and the negative biaxial retardation film may be disposed between the positive-A film and the positive-C film.

In some embodiments, when the optical waveplate provides a non-zero fractional-wave phase retardance, the optical waveplate may be configured to rotate a polarization of a broadband light (e.g., a polychromatic light) over a range of wavelengths and/or a range of incident angles. An amount of the non-zero fractional-wave phase retardance provided by the optical waveplate may be substantially wavelength independent over the range of wavelengths and/or substantially incident angle independent over the range of incident angles. In some embodiments, the optical waveplate may be configured to perform a polarization conversion from a first polarization to a second polarization for the broadband light (e.g., a polychromatic light) over the range of wavelengths and/or the range of incident angles. In some embodiments, when the optical waveplate provides a substantially zero retardance (or an equivalent full-wave retardance, e.g., one full-wave retardance, two full-wave retardance, etc.), the optical waveplate may be configured to substantially maintain a polarization of the broadband light (e.g., a polychromatic light) over the range of wavelengths and/or the range of incident angles.

FIG. 1 illustrates a schematic diagram of an optical waveplate 100 according to an embodiment of the present disclosure. The optical waveplate 100 may include a plurality of optical components arranged in an optical series. For illustrative purposes, FIG. 1 shows that the optical waveplate 100 includes four optical components 101, 102, 103, and 104. In some embodiments, the optical waveplate 100 may include any suitable number (e.g., two, three, five, six, etc.) of optical components. Each optical component may have a specific optical property. When combined, the four optical components may render desirable optical properties for the optical waveplate 100. For example, the optical waveplate 100 may be configured to provide an amount of phase retardance to a broadband light (e.g., a polychromatic light) over a range of wavelengths and/or over a range of incident angles. The four optical components may be oriented relative to each other, such that the amount of phase retardance provided by the optical waveplate 100 to the broadband light may be substantially wavelength independent (or independent of the wavelength) over the range of wavelengths and/or substantially independent of the incident angle (or incident angle independent) over the range of the incident angles. In some embodiments, when the optical waveplate 100 provides a non-zero fractional-wave phase retardance, the optical waveplate 100 may be configured to perform a polarization conversion from a first polarization to a second polarization for broadband light (e.g., a polychromatic light) over the range of wavelengths and/or the range of incident angles. In some embodiments, when the optical waveplate 100 provides a substantially zero retardance (or an equivalent full-wave retardance, e.g., one full-wave retardance, two full-wave retardance, etc.), the optical waveplate 100 may be configured to substantially maintain a polarization of the broadband light (e.g., a polychromatic light) over the range of wavelengths and/or the range of incident angles.

In some embodiments, the optical waveplate 100 may include an LC cell and a plurality of compensation films arranged in an optical series. The LC cell may include a nematic LC layer aligned in an OCB mode, where the nematic LC molecules near or adjacent the upper and lower substrates may be aligned in a parallel direction. In some embodiments, the compensation films may include one or more positive-C films, one or more positive-A films, and/or one or more negative biaxial retardation films. As used herein, the term "film" may encompass film, plate, layer, etc., and can be any suitable thickness. The compensation films are optical films that may compensate for wavelength dispersion and an axial phase difference so as to overcome a restricted viewing angle caused by the parallel alignment of the nematic LC molecules at the boundaries of the LC cell. The compensation films may be optically transmissive (e.g., substantially transparent) for lights in the visible band (about 380 nm to about 700 nm), and in a portion of the infrared ("IR") band (about 700 nm to about 1 mm). In some embodiments, a retardation film may be a film including polymerized or crosslinked LC materials. For example, the retardation film may be obtained by disposing a layer of polymerizable LC material precursors on a substrate, polymerizing the LC materials that are homogeneously or homeotropically aligned in an LC phase (e.g., photo-polymerizing by exposure to a linear polarized light, or thermal-polymerizing by exposure to a predetermined temperature), and optionally removing the polymerized material from the substrate.

In some embodiments, the LC cell may be an active component in the optical waveplate 100, and other components included in the optical waveplate 100 may be passive. The term "active" means that the optical property (e.g., retardance) of the LC cell may be variable or switchable by an external field (e.g., an electric field, a magnetic field, or a light field) applied to the LC cell. In some embodiments, the compensation films may be passive components. In other words, no external field is applied to the compensation films to change or switch the optical properties of the compensation films. For example, the LC cell that is an active component may provide a variable phase retardance under different driving voltages, while a compensation film that is a passive element may provide a constant phase retardance. Through adjusting the driving voltage applied to the LC cell, the optical waveplate 100 may be configured to provide various phase retardances for a predetermined spectrum, such as $\lambda/4$ (90°) retardance, $\lambda/2$ (180°) retardance, $\lambda$ (360°) retardance, where $\lambda$, is a predetermined wavelength. By switching the driving voltage applied to the LC cell, the optical waveplate 100 may be switchable between states of different phase retardances.

The compensation films and the LC cell may be arranged in a suitable configuration to achieve desirable optical properties of the optical waveplate 100. In one embodiment, as shown in FIG. 1, the optical component 101 may be the positive-A film, the optical component 102 may be the negative biaxial retardation film, the optical component 103 may be the positive-C film, and the optical component 104 may be the LC cell having the LC layer aligned in the OCB mode. That is, the positive-C film 103 may be disposed at a side of the LC cell 104. The positive-C film 103 may have a first side facing the LC cell 104 and an opposing second side, and the negative biaxial retardation film 102 may be disposed at the second side of the positive-C film 103. The negative biaxial retardation film 102 may have a first side facing the positive-C film 103 and an opposing second side, and the positive-A film 101 may be disposed at the second side of the negative biaxial retardation film 102.

The stack configuration of the four optical components shown in FIG. 1 is for illustration only. Other suitable arrangements may also be used. In addition, in some embodiments, any other combinations of any number of optical components may be used. For example, in some embodiments, the optical waveplate 100 may include one layer, two layers, three layers, five layers, six layers, etc. In some embodiments, the four layers shown in FIG. 1 may be arranged in another order or sequence.

Figure 2:
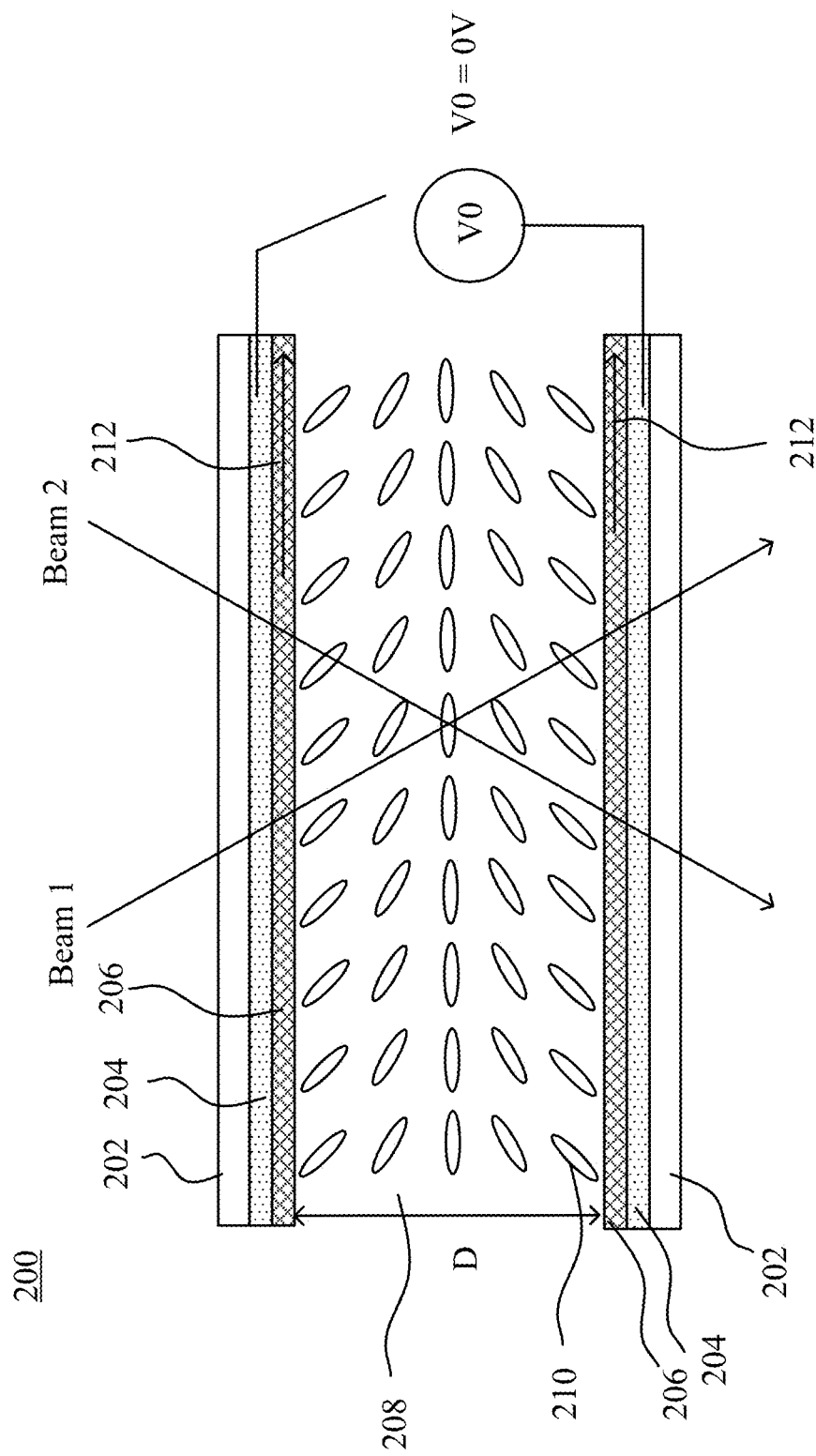
FIG. 2 illustrates a schematic cross-sectional view of a Pi-cell in a splay state according to an embodiment of the present disclosure.

FIG. 2 illustrates a schematic cross-sectional view of an LC cell 200 according to an embodiment of the present disclosure. The LC cell 200 may be an embodiment of the LC cell 104 included in the optical waveplate 100, as shown in FIG. 1. As shown in FIG. 2, the LC cell 200 may include upper and lower substrates 202 arranged opposite to each other, e.g., a top substrate and a bottom substrate. The substrates 202 may be at least partially optically transmissive (e.g., substantially transparent) to lights in the visible band (about 380 nm to about 700 nm). In some embodiments, the substrates 202 may also be at least partially optically transmissive (e.g., substantially transparent) to in a portion of the infrared ("IR") band (about 700 nm to about 1 mm). The substrates 202 may include a suitable material that is at least partially optically transmissive (e.g., substantially transparent) to lights in above-listed wavelengths range, e.g., $SiO_2$, plastic, sapphire, etc. The substrate 202 may be rigid, semi-rigid, flexible, or semi-flexible. In some embodiments, the substrate 202 may be a part of another optical device or another optoelectrical device. For example, the substrate 202 may be a part of a functional device, such as a display screen. In some embodiments, the substrate 202 may be a part of an optical lens assembly, such as a lens substrate of the optical lens assembly. Electrodes 204 may be disposed on opposing surfaces of the substrates 202 and may be configured to apply an electric field. In some embodiments, the electrodes 204 may be indium tin oxide ("ITO") electrodes.

The LC cell 200 may include at least one alignment layer 206 configured to at least partially align the LC molecules included in the LC cell 200. In the embodiment shown in FIG. 2, two alignment layers 206 are disposed on opposing surfaces of the electrodes 204. In some embodiments, one of the alignment layers 206 may be omitted. In some embodiments, both of the alignment layers 206 may be omitted. In such embodiments, the alignment of the LC molecules included in the LC cell 200 may be introduced in the LC molecules through bulk alignment using, e.g., an external electric field, an external light field, or an external magnetic field, etc. The LC cell 200 may also include an LC layer 208 may be sandwiched between the two alignment layers 206. The LC layer 208 may include nematic LC molecules 210. The two alignment layers 206 may be configured with a homogeneous parallel alignment direction, for example, in a x-direction indicated by an arrow 212, through which the LC layer 208 may be aligned in the OCB mode. That is, the nematic LC molecules 210 adjacent or near the upper and lower substrates 202 may be oriented in a parallel direction.

The LC cell 200 may be referred to as a Pi-cell. The name Pi-cell comes from the twist of directors of LC molecules, which is 180° formed by the parallel alignment direction (e.g., parallel rubbing direction) on each substrate. As a comparison, in a TNLC cell, the alignment directions on two substrates are perpendicular to each other. Thus, a 90° twist of LC directors from one substrate to the other is formed inside the TNLC cell. Further, in the Pi-cell, nematic LC molecules 210 adjacent or near the upper and lower substrates 202 may be aligned uniformly along a predetermined pre-tilt angle θ and a pre-twisted angle φ, allowing the LC molecules 210 to maintain a slight inclination in a predetermined direction when an external voltage is not applied between the substrates 202. The pre-tilt angle θ is defined as an angle between the long axis of the LC molecule 210 and the substrate 202.

Figure 3:
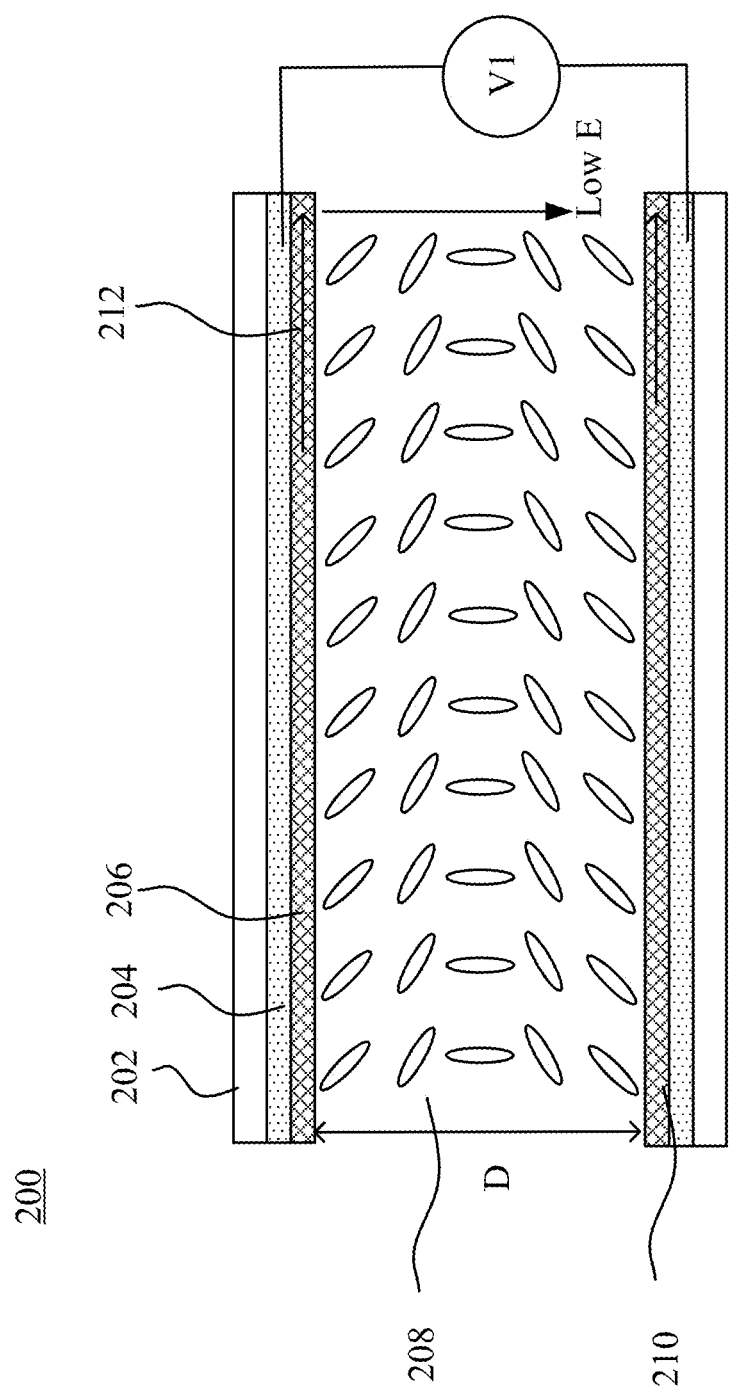
FIG. 3 illustrates a schematic cross-sectional view of a Pi-cell in a bend state according to an embodiment of the present disclosure.
Figure 4:
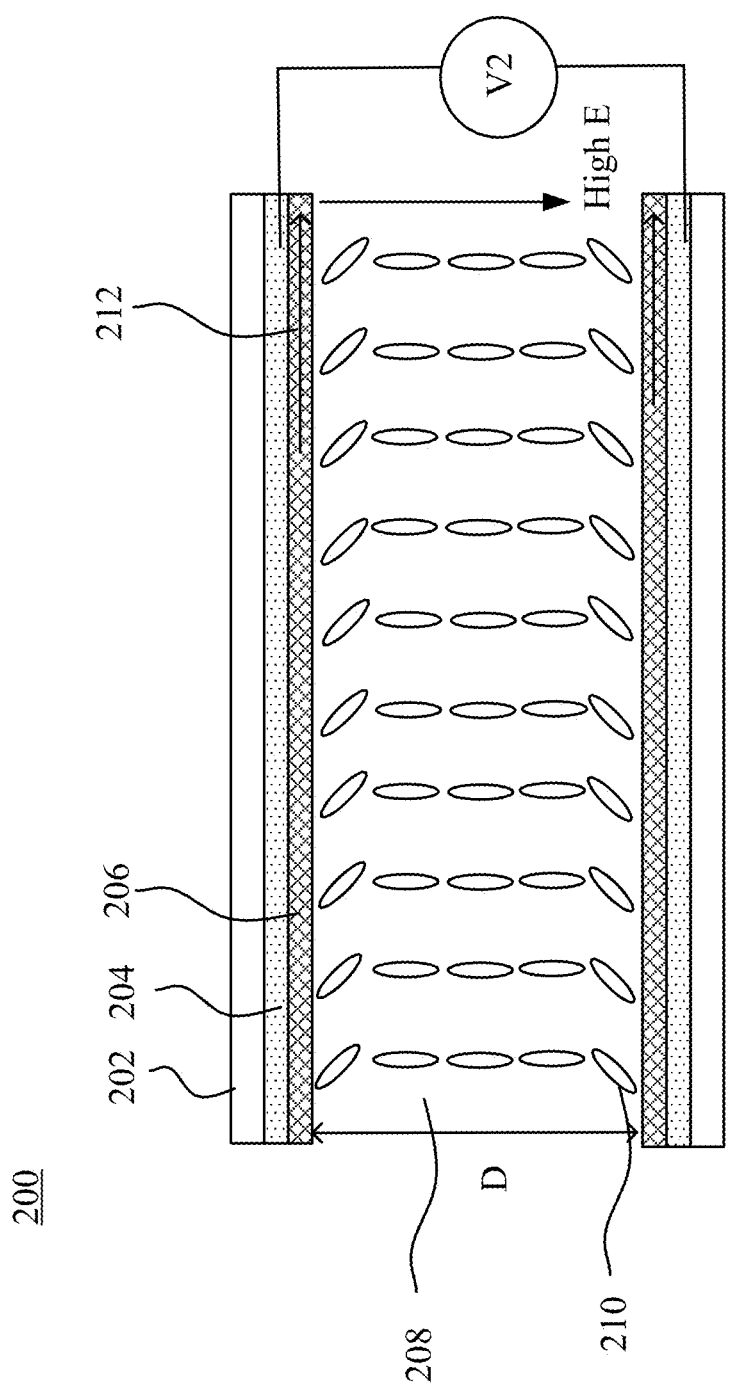
FIG. 4 illustrates a schematic cross-sectional view of a Pi-cell in a homeotropic state according to an embodiment of the present disclosure.

FIGS. 2-4 illustrate a switching process of the LC cell 200 by an external electric field. In a voltage-off state (e.g., $V_0$=0V, or more generally, or more generally below a threshold voltage of the LC cell 200), as shown in FIG. 2, the LC cell 200 may be in a splay state in which the LC molecules 210 are elastically deformed at a splay configuration because of surface constraints. Thus, the LC molecules 210 may be oriented parallel to the alignment directions 212 of both alignment layers 206. For example, the LC molecules 210 at the middle portion of the LC layer 208 are parallel to the alignment directions 212, and the LC molecules 210 at other portions between the middle portion and the substrates alignment layers 206 are substantially parallel to the alignment directions 212 with small pretilt angles (e.g., 0°-10°, etc.).

In a voltage-on state, when a relatively low electric field is applied (e.g., when a relatively low voltage $V_1$ (e.g., $V_1$=2V) is applied) to the LC cell 200, as shown in FIG. 3, the LC cell 200 may be switched to a bend state, in which the LC molecules 210 at the middle portion of the LC layer 208 are reoriented by the electric field E to be perpendicular to the substrates 202, while other LC molecules 210 between the middle portion and the alignment layers 206 are still oriented substantially parallel to the alignment directions 212 because of the surface constraints of the alignment layers 206. When a relatively high electric field is applied (e.g., when a relatively high voltage $V_2$ (e.g., $V_2$=10V) to the LC cell 200, as shown in FIG. 4, the LC cell 200 may be switched to a homeotropic state, in which the majority of the LC molecules 210 are reoriented by the electric field E to be perpendicular to the substrates 202 (except for the LC molecules 210 near (e.g., in direct contact with) the alignment layers 206). To obtain the bend state of the LC cell 200, an electric field greater than a predetermined splay-to-bend transition electric field (e.g., voltage) may be applied. To obtain the homeotropic structure of the LC cell 200, an electric field greater than a bend-to-homeotropic transition electric field (e.g., voltage) may be applied. The transition electric fields (e.g., transition voltages) may be determined by the LC materials and the thickness of the LC layer 208.

Compared to other LC switching modes such as twisted nematic ("TN"), vertically aligned ("VA") and in-plane-switching ("IPS") modes, the Pi-cell exhibits a fast switching speed because of the reduced backflow effect. Moreover, the Pi-cell has an intrinsic wide viewing angle because of the self-compensated structure. As shown in FIG. 2, beam 1 and beam 2 transmitted through the LC cell 200 in two oblique incidence directions may experience the same retardation. The self-compensation nature may not be applicable to lights with incident angles out of the director plane. Furthermore, the on-axis contrast ratio ("CR") may be low due to the residual birefringence even at a relatively high voltage. Thus, it may be desirable to couple optical compensation films with the LC cell 200 to achieve a high CR and a wide viewing angle.

Figure 5:
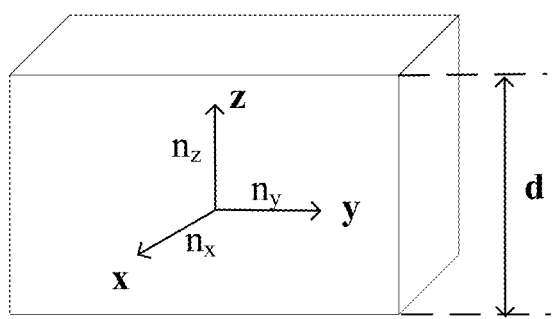
FIG. 5 illustrates refractive indices of a retardation film according to an embodiment of the present disclosure.

FIG. 5 illustrates refractive indices of a retardation film 500. As shown in FIG. 5, $n_x$ and $n_y$ are principal refractive indices in orthogonal directions at a film plane (e.g., x-y plane in FIG. 5) and $n_z$ is a principal refractive index in an out-of-plane vertical direction (e.g., z-direction in FIG. 5), which is also referred to as the refractive index in the film thickness direction. Depending on the magnitudes of the refractive indices, the characteristics and the types of the retardation films may be determined.

A positive-A film is a retardation film where $n_x > n_y = n_z$. The in-plane retardance of the positive-A film is determined by the difference between two refractive indices in the film plane as well as the thickness of the film according to the following Equation (1):

$$R_{in} = d \times (n_x - n_y) \qquad (1),$$

wherein d is the thickness of the film, and $\Delta n_{xy} = n_x - n_y$ is the in-plane birefringence of the film. A positive-A film typically has its optical axis aligned parallel to the plane of the film. (e.g., x-y plane).

A positive-C film is a retardation film where $n_x = n_y < n_z$. The thickness-direction retardance of the positive-C film is determined by the difference between an in-plane refractive index and a thickness-direction refractive index as well as a thickness of the film according to the following Equation (2):

$$R_{th} = d \times (n_z - n_y) \qquad (2),$$

wherein d is the thickness of the film, and $\Delta n_{zy} = n_z - n_y$ is the out-of-plane (or thickness direction) birefringence of the film. That is, the positive-C film is a retardation film having a substantially zero in-plane retardance and a positive thickness-direction retardance. The positive-C film typically has its optical axis aligned to be perpendicular to the plane of the film (e.g., x-y plane). The positive-C film may include a nematic LC layer where the tilt angle θ of the nematic LC molecules varies along the thickness direction of the film, e.g., the tilt angle θ of the nematic LC molecules is a function of the film thickness. The tilt angle θ is defined as an angle between the long axis or the director of the LC molecule and the film plane.

A negative biaxial retardation film is a retardation film where $n_x > n_y > n_z$. The negative biaxial retardation film has both an in-plane retardance Rb and a thickness-direction retardance $R_{tb}$, which are defined as follows:

$$R_{ib} = d \times (n_x - n_y) \qquad (3),$$

$$R_{tb} = d \times (n_z - n_y) \qquad (4),$$

wherein d is the thickness of the film, $\Delta n_{xy}=n_x-n_y$ is the in-plane birefringence of the film, and $\Delta n_{zy}=n_z-n_y$ is the out-of-plane (or thickness direction) birefringence of the film. That is, the negative biaxial retardation film may have a positive in-plane retardance and a negative thickness-direction retardance.

Figure 6:
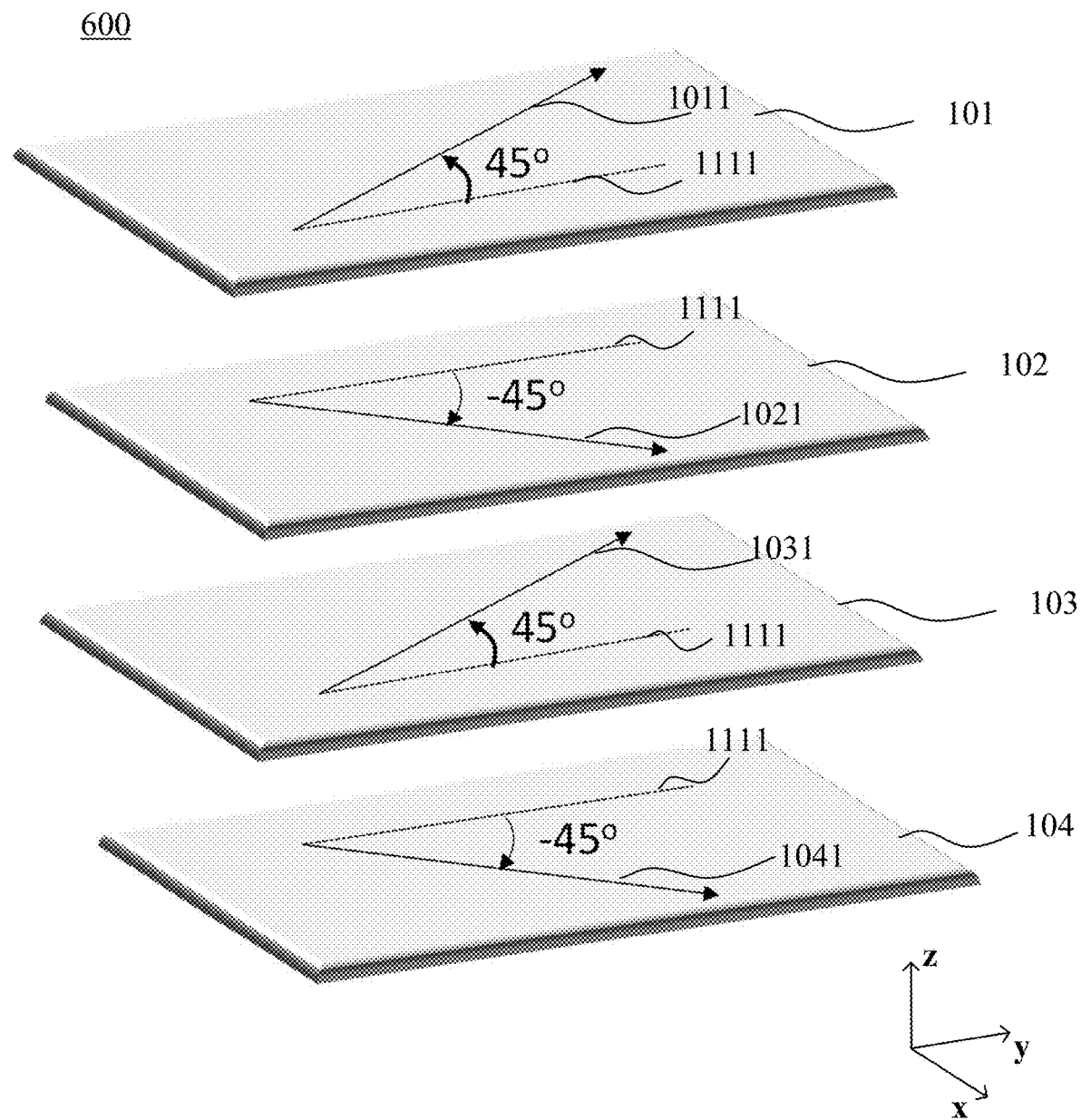
FIG. 6 illustrates a schematic diagram of film orientations in an optical waveplate according to an embodiment of the present disclosure.

In the disclosed embodiments, the fast axis or slow axis of a retardation film may be oriented relative to the alignment direction of the LC cell to achieve predetermined optical properties of the optical waveplate. FIG. 6 illustrates a schematic diagram of film orientations in an optical waveplate 600 according to an embodiment of the present disclosure. The optical waveplate 600 may be an embodiment of the optical waveplate 100 shown in FIG. 1. In FIG. 6, the optical component 101 (e.g., a positive-A film), the optical component 102 (e.g., a negative biaxial retardation film), the optical component 103 (e.g., a positive-C film), and the optical component 104 (e.g., an LC cell) are displayed in an exploded view for illustrative purposes. As shown in FIG. 6, an alignment direction 1041 of the LC cell 104 may be orientated at about −35° to about −50° relative to a predetermined direction 1111 (e.g., y-axis in FIG. 6). The alignment direction 1041 may be a preferential alignment direction of the LC molecules included in the LC cell 104 (or a macroscopic alignment direction of the LC cell 104). A fast axis 1031 of the positive-C film 103 may be orientated at about 35° to about 50° relative to the predetermined direction 1111. A slow axis 1021 of the negative biaxial retardation film 102 may be orientated at about −35° to about −50° relative to the predetermined direction 1111. A slow axis 1011 of the positive-A film 101 may be orientated at about 35° to about 50° relative to the predetermined direction 1111. In some embodiments, the predetermined direction 1111 may be a polarization direction of a linearly polarized light incident onto the LC cell 104.

In one embodiment, as shown in FIG. 6, the alignment direction 1041 of the LC cell 104 may be orientated by about −45° relative to the y-direction (an example of the predetermined direction 1111). The fast axis 1031 of the positive-C film 103 may be orientated by about 45° relative to the y-direction. The slow axis 1021 of the negative biaxial retardation film 102 may be orientated by about −45° relative to the y-direction. The slow axis 1011 of the positive-A film 101 may be orientated by about 45° relative to the y-direction.

In one embodiment, the LC cell 104 may include liquid crystal materials having the following properties: $K_{33}/K_{11}=1.3437$, $K_{22}/K_{11}=0.5937$, $\Delta\varepsilon=11$, where $K_{11}$, $K_{22}$, and $K_{33}$ are splay, twist, and bend elastic constants of the liquid crystal materials. The LC cell 104 may have a pre-tilt angle of about 3°, a thickness of about 1.3 μm, and a birefringence ($\Delta n$) of about 0.18. The positive-A film 101 may have a pre-tilt angle of about 3°, a thickness of about 1 μm, and an in-plane birefringence ($\Delta n$) of about 0.18. The negative biaxial retardation film 102 may have a pre-tilt angle of about 90°, a thickness of about 1 μm, and an out-of-plane birefringence ($\Delta n$) of about −0.11.

Figure 7A:
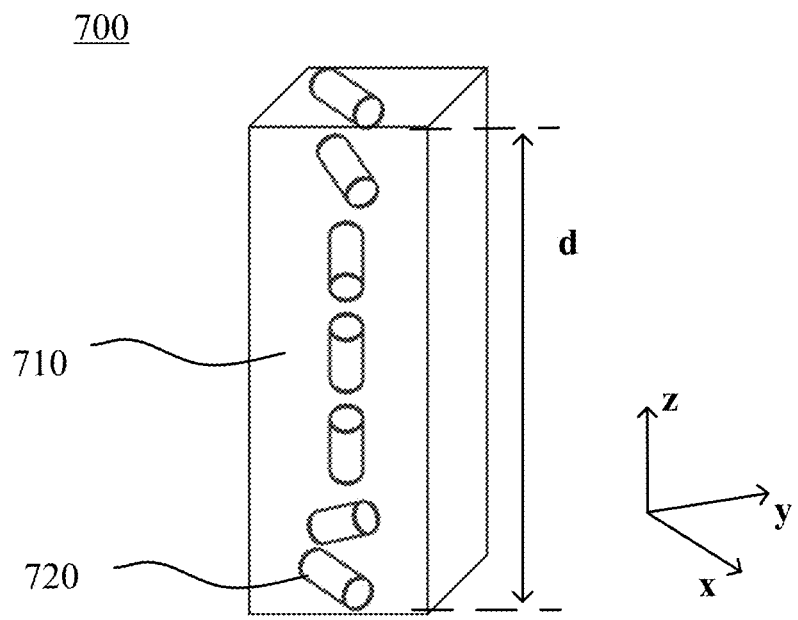
FIG. 7A illustrates a schematic diagram of a positive-C film according to an embodiment of the present disclosure.
Figure 7B:
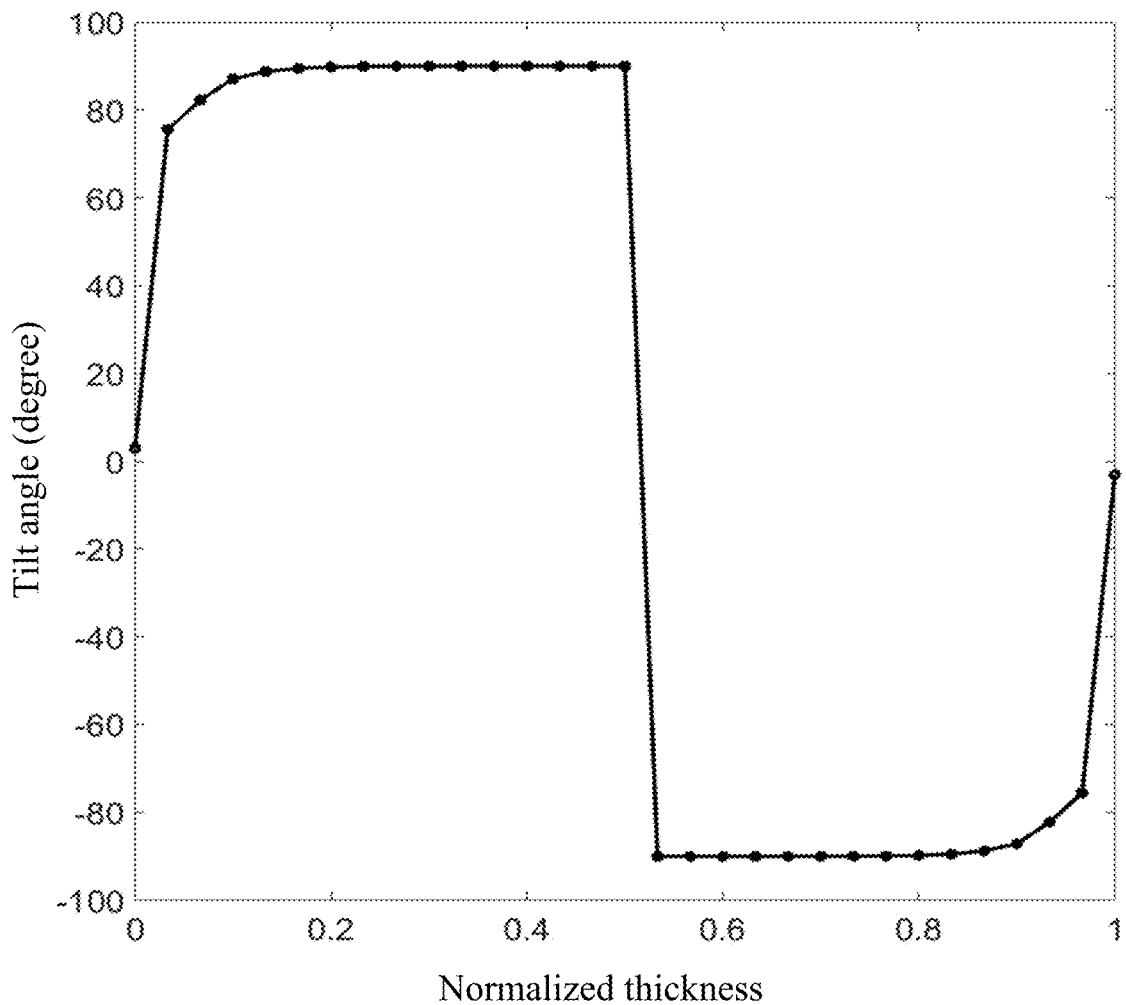
FIG. 7B illustrates tilt angles of liquid crystal ("LC") molecules in a positive-C film according to an embodiment of the present disclosure.

The positive-C film 103 may have a thickness of about 2 μm and an out-of-plane birefringence ($\Delta n$) of about 0.18. An exemplary LC configuration 700 of the positive-C film 103 is shown in FIG. 7A, and the relationship between the tilt angle and the film thickness of the positive-C film 103 is shown in FIG. 7B. As shown in FIGS. 7A and 7B, the positive-C film 103 may include a nematic LC layer 710, where the tilt angle of the LC molecules 720 may vary along the thickness direction of the film. For example, the tilt angle of the LC molecules 720 may gradually vary from about 3° to about 90° as the normalized film thickness increases from about 0 to about 0.5, then abruptly increase to about −90° when the normalized film thickness approaches 0.55, change from about −90° to about −75° in a relative slow speed as the normalized film thickness increases from about 0.55 to about 0.85, and change from about −75° to about −3° in a relative fast speed as the normalized film thickness increases from about 0.85 to about 1. That is, along the thickness direction of the nematic LC layer 710, the absolute values of the tilt angles of the LC molecules 720 in the nematic LC layer 710 may gradually increase from two edges to a center portion of the nematic LC layer 710, respectively.

The LC configuration 700 of the positive-C film 103 shown in FIG. 7A is for illustrative purposes, and is not intended to limit the scope of the present discourse. The LC configuration 700 of the positive-C film 103 may be determined by various factors, such as the phase to be achieved, the compensation effect to be achieved, etc. In some embodiments, when the tilt angles of the LC molecules 720 gradually increase from each of two edges of the nematic LC layer 710 to the center portion of the nematic LC layer 710, the absolute values the tilt angles of the LC molecules 720 at each of two edges of the nematic LC layer 710 may be in a range of about 0° to 5° (e.g., 1° to 3°), and the absolute values the tilt angles of the LC molecules 720 at the center portion of the nematic LC layer 710 may be in a range of about 85° to 90° (e.g., 88° to) 90°. In some embodiments, the positive-C film includes an LC material with a negative dielectric anisotropy. In some embodiments, the positive-C film includes an LC material with a positive dielectric anisotropy.

Figure 8:
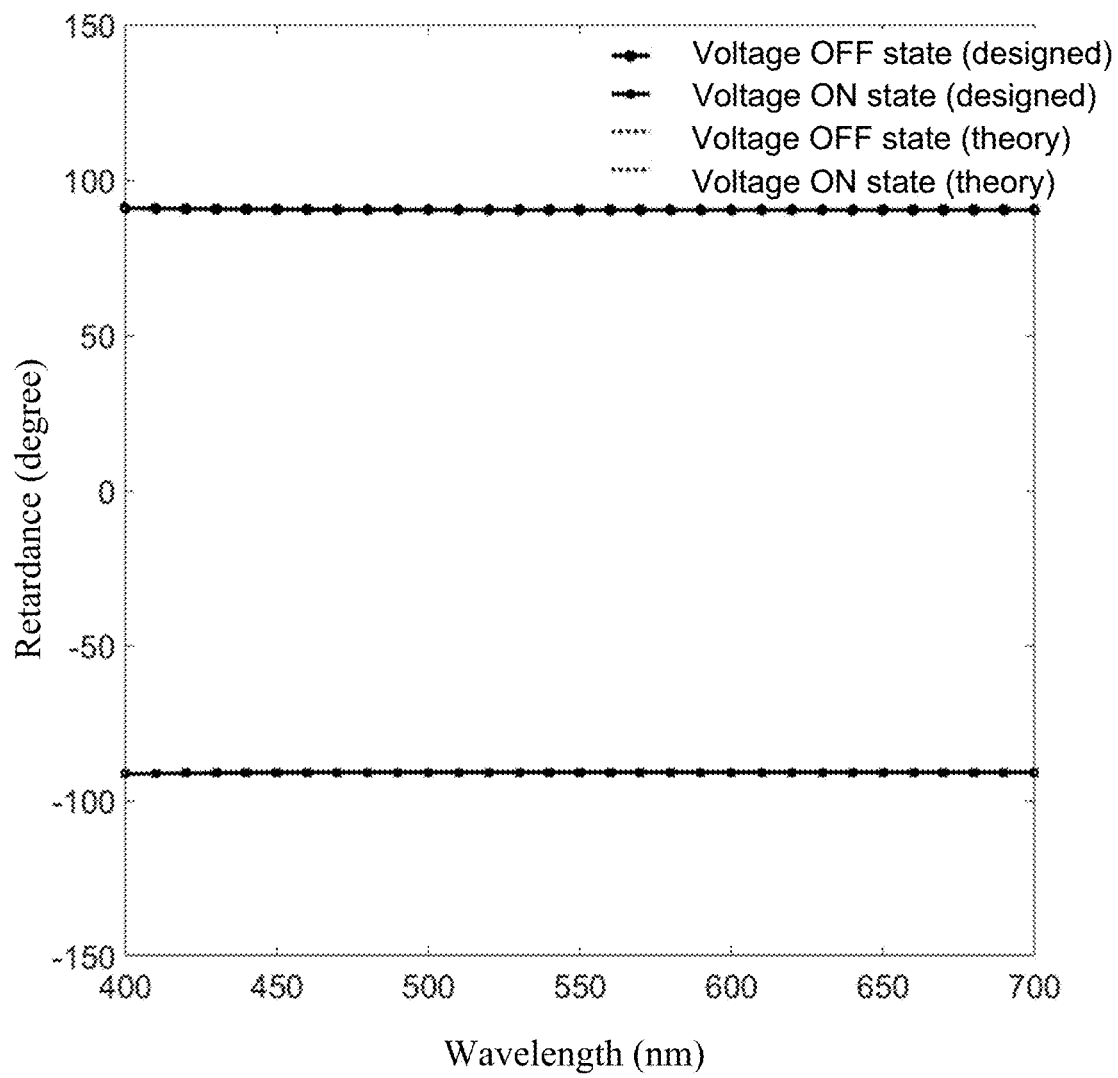
FIG. 8 illustrates simulation results regarding broadband performance of an optical waveplate according to an embodiment of the present disclosure.
Figure 9:
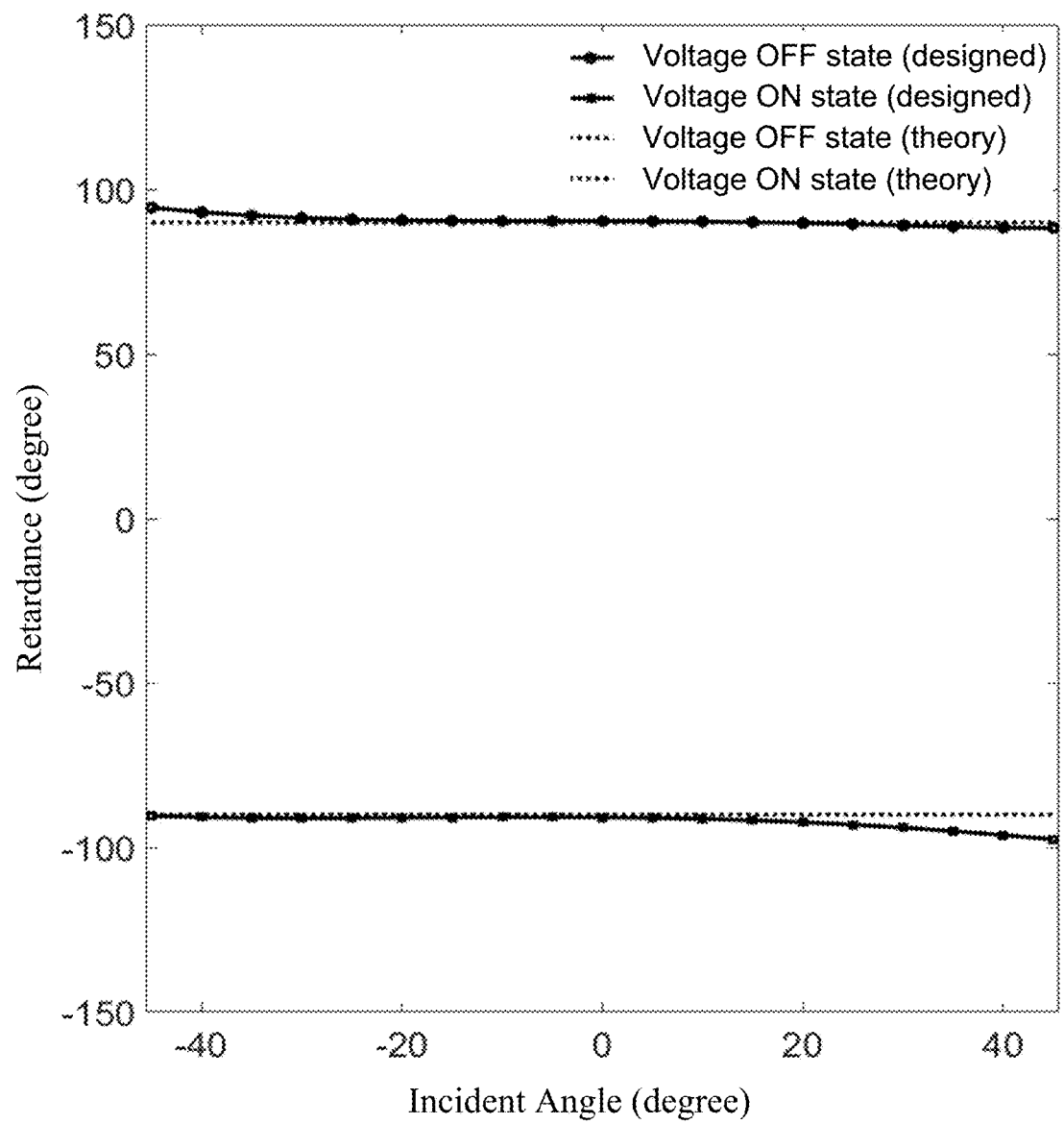
FIG. 9 illustrates simulation results regarding large viewing angle performance of the optical waveplate according to an embodiment of the present disclosure.
Figure 10:
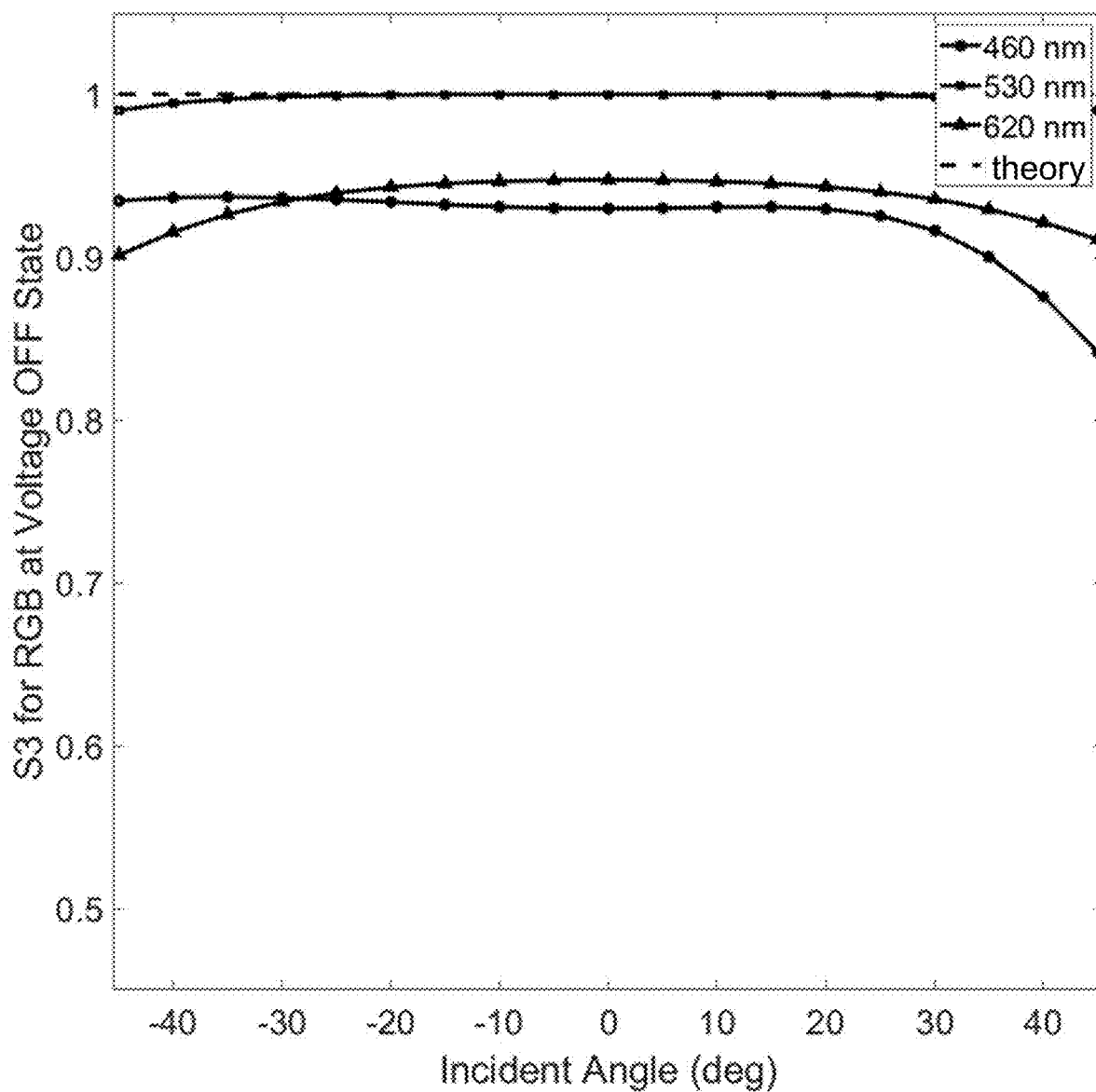
FIG. 10 illustrates simulation results regarding Stokes parameter S3 of an output light versus incident angles when no electric field is applied to the optical waveplate, according to an embodiment of the present disclosure.
Figure 11:
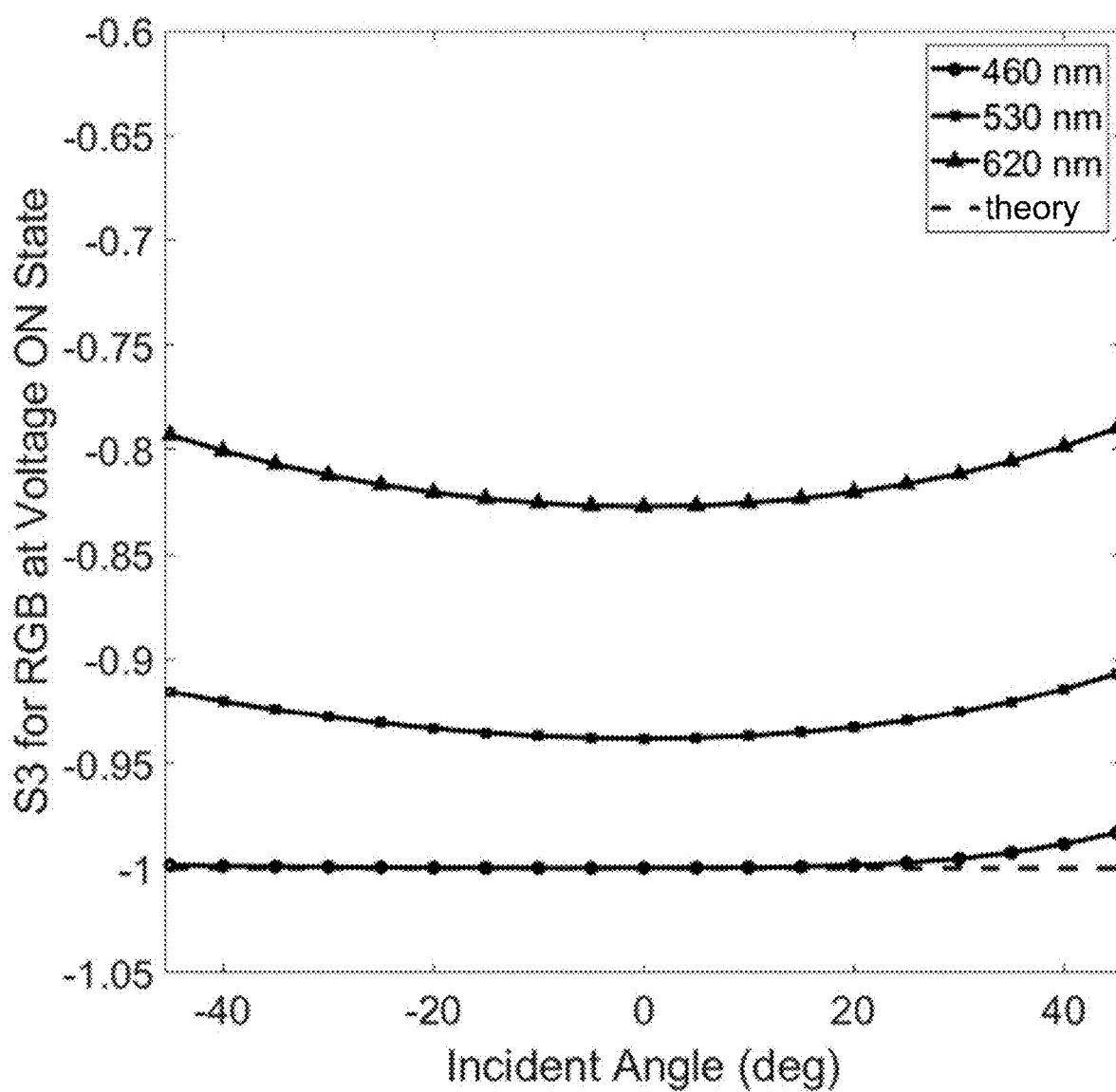
FIG. 11 illustrates simulation results regarding Stokes parameter S3 for of an output light versus incident angles when an electric field is applied to the optical waveplate, according to an embodiment of the present disclosure.

In the following, simulation results of the optical properties of the optical waveplate 600 are illustrated in FIGS. 8-11. FIG. 8 illustrates simulation results showing a relationship between a retardance of the optical waveplate 600 and an incident wavelength (e.g., a wavelength of an incident light). FIG. 9 illustrates simulation results showing a relationship between the retardance of the optical waveplate 600 and an incident angle. FIG. 10 illustrates the simulation results showing a relationship between the Stokes parameter S3 of the light transmitted through the optical waveplate 600 (i.e., output light) and the incident angle of the light incident onto the optical waveplate 600 (i.e., input light) when the LC cell 104 is switched off to be in the splay state ($V_0=0V$). FIG. 11 illustrates the simulation results showing a relationship between the Stokes parameter S3 of the light transmitted through the optical waveplate 600 (i.e., output light) and the incident angle of the light incident onto the optical waveplate 600 (i.e., input light) when the LC cell 104 is switched on to be at the homeotropic state (e.g., $V_2=10V$). In the simulations, the optical waveplate 600 is configured to provide a 90° retardance when the LC cell 104 is switched off to be in the splay state ($V_0=0V$) and to provide a −90° retardance when the LC cell 104 is switched on to be at the homeotropic state (e.g., $V_2=10V$). The light incident onto the optical waveplate 600 is presumed to be a linearly polarized light, and an angle between the polarization direction of the light and the alignment direction of the LC cell 104 is presumed to be about 45°. In some embodiments, the light incident onto the optical waveplate 600 may be linearly polarized in the y-axis direction shown in FIG. 6.

As shown in FIG. 8, the vertical axis is the phase retardance provided by the optical waveplate 600, and the horizontal axis is the wavelength (in nm) of the light incident onto the optical waveplate 600. When the LC cell 104 is at a voltage-off state, the optical waveplate 600 may provide a phase retardance of about 90° for a broadband light (e.g., a polychromatic light) over a range of wavelengths, e.g. a range from about 400 nm to about 700 nm. When the LC cell 104 is at a voltage-on state and a homeotropic state (e.g., $V_2$=10V), the optical waveplate 600 may provide a phase retardance of about −90° for the broadband light. That is, at each of the voltage-on (or switch-on) and voltage-off (or switch-off) states of the LC cell 104, the optical waveplate 600 may provide a predetermined phase retardance (e.g., a phase retardance of about 90° at the voltage-on state, or a phase retardance of about −90° at the voltage-off state) to a broadband light (e.g., a polychromatic light) over a range of wavelengths, e.g. a range from about 400 nm to about 700 nm, where the predetermined phase retardances may be substantially wavelength independent over the range of wavelengths.

As shown in FIG. 9, the vertical axis is the phase retardance provided by the optical waveplate 600, and the horizontal axis is the incident angle of the light incident on the optical waveplate 600. When the LC cell 104 is at the voltage-off state, the optical waveplate 600 may provide a phase retardance of about 90° to about 95° for lights with an incident angle in a range of about −45° to about 45°. When the LC cell 104 is at the voltage-on state and at the homeotropic state (e.g., $V_2$=10V), the optical waveplate 600 may provide a phase retardance of about −90° to about −100° for lights with an incident angle in a range of about −40° to about 40°. That is, at each of the voltage-on and voltage-off states of the LC cell 104, the optical waveplate 600 may provide a phase retardance close to a predetermined, theoretical retardance (e.g., close to 90° or 90°), to a broadband light (e.g., a polychromatic light) over a range of incident angles, e.g. a range from about −45° to about 45°.

As shown in FIG. 10, the horizontal axis is the incident angle of the input light, and the vertical axis is the Stokes parameter S3 of the output light of the optical waveplate 600. The incident angle dependent Stokes parameter S3 is evaluated at wavelengths of 460 nm, 530 nm, and 620 nm, respectively. FIG. 10 shows that, when the LC cell 104 is at the voltage-off state, at wavelengths of 460 nm, 530 nm, and 620 nm, for a wide range of incident angles (e.g., about −40° to about 35°), the Stokes parameter S3 of the output light may remain at or above 0.9, which is close to 1.0 (the theoretical value).

A person having ordinary skills in the art can understand that the right-handed circularly polarized light has the Stokes parameter S3=1.0, and the closer the Stokes parameter S3 approaches 1.0, the closer the output light approaches a right-handed circularly polarized light. Thus, according to FIG. 10, for a wide range of incident angles and wavelengths, the output light of the optical waveplate 600 when the LC cell 104 is switched off may be a right-handed circularly polarized output light (S3=1.0) or a substantially right-handed circularly polarized output light (S3≈1.0, e.g., S3≥0.9). That is, the optical waveplate 600 may convert the linearly polarized incident light to a right-handed circularly polarized output light or a substantially right-handed circularly polarized output light over a wide range of incident angles and wavelengths. In other words, when the LC cell 104 is at the voltage-off state and at the splay state, the optical waveplate 600 may have the broadband and large viewing angle performance.

As shown in FIG. 11, the horizontal axis is the incident angle of the input light, and the vertical axis is the Stokes parameter S3 of the output light. The incident angle dependent Stokes parameter S3 is evaluated at wavelengths of 460 nm, 530 nm, and 620 nm, respectively. As shown in FIG. 11, when the LC cell 104 is at the voltage-on state and at the homeotropic state, at wavelengths of 460 nm and 530 nm, for a wide range of incident angles (e.g., about −40° to about 40°), the Stokes parameter S3 of the output light may remain at or below about −0.9, which is close to −1.0. At the wavelength of 620 nm, for a wide range of incident angles (e.g., about −40° to about 40°), the Stokes parameter S3 of the output light may remain at or below about −0.8.

A person having ordinary skills in the art can understand that the left-handed circularly polarized light has the Stokes parameter S3=−1.0, and the closer the Stokes parameter S3 approaches −1.0, the closer the output light approaches a left-handed circularly polarized light. Thus, according to FIG. 11, for a wide range of incident angles and wavelengths, the output light of the optical waveplate 100 when the LC cell 104 is switched on to be at the homeotropic state may be a left-handed circularly polarized output light (S3=−1.0) or a substantially left-handed circularly polarized output light (S3≈−1.0). That is, when the LC cell 104 is at the voltage-on state and at the homeotropic state, the optical waveplate 100 may convert the linearly polarized incident light to a left-handed circularly polarized output light or a substantially left-handed circularly polarized output light over a wide range of incident angles and wavelengths. In other words, when the LC cell 104 is at the voltage-on state and at the homeotropic state, the optical waveplate 600 may have excellent broadband and large viewing angle performance.

In some embodiments, the optical waveplate may include an active LC cell (e.g., only one active LC cell) that is controllable by an external electric field to switch between different states, while the compensation films may be passive elements. For example, the LC cell may be configured to switch between the splay state (e.g., $V_0$=0V) and the homeotropic state (e.g., $V_2$=10V) rather than being switched between the bend state (e.g., $V_1$=2V) and the homeotropic state (e.g., $V_2$=10V) in conventional LC cells. Thus, a driving voltage may be applied only to the LC cell 104 at the homeotropic state (e.g., $V_2$=10V). Accordingly, the power consumption of the optical waveplate may be reduced.

Further, the compensation films together may be configured to provide a majority portion of the retardance of the optical waveplate. That is, in a total retardance provided by the optical waveplate for a linearly incident light, the three compensation films together may provide a larger portion of the total retardance than the LC cell. For example, the compensation films together may provide a larger than about 95%, 90%, 85%, 80%, 75%, 70%, 65%, or 60% of the total retardance and, accordingly, the LC cell may provide smaller than about 5%, 10%, 15%, 20%, 25%, 30%, 35% or 40% of the total retardance. Through configuring the compensation films together to provide more than half (50%) of the retardance of the optical waveplate, the cell gap of the LC cell may be configured to be substantially small, which may reduce the driving voltage for the homeotropic state and the relaxing time transitioning from the homeotropic state to the splay state.

When the cell gap of the LC cell is substantially small, strong anchoring may occur at the surfaces of the alignment layers, resulting in the splay state of the LC cell being a stable state. Thus, when the LC cell is switched between the splay state under a zero voltage and the homeotropic state under a relatively high voltage (e.g., $V_2$=10V), the transition from the homeotropic state to the splay state after removing the applied voltage may still be substantially fast due to the reduced backflow effect in the Pi-cell. In contrast, when the cell gap is substantially large, the bend state of the LC cell may become the stable state after removing the applied voltage. As a result, when the LC cell relaxes from the homeotropic state to the splay state after removing the applied voltage, the transition from the bend state to the splay state may take a long time, for example, several seconds. In some embodiments, the thickness of the LC cell in the disclosed optical waveguide may be configured to be about 1-1.5 μm. According to the present disclosure, the disclosed optical waveplate may have a reduced switching time and an improved spectral and angular performance as compared to a conventional broadband and wide-viewing-angle waveplate using TNLC cells.

In some embodiments, the compensation films (e.g., the positive-C film, the positive-A film, the negative biaxial retardation film) and the LC cell in the optical waveplate may be made of the same LC material and, thus, may have the same birefringence property. Any change in temperature that consequently changes the refractive index of the LC material may be identical for the LC cell and the compensation films, such that the LC cell and the compensation films may self-compensate each other for a large range of temperature variation. Accordingly, the temperature stability and reliability of the optical waveplate may be improved.

In some embodiments, the disclosed optical waveplate may include more than one active cell (e.g., more than one LC cell). The more than one LC cell may be combined with one or more compensation films, such as one or more negative biaxial retardation films, one or more positive-A films, one or more positive-C films. The number of compensation films may be determined based on the number of active cells and the optical properties to be achieved in the optical waveplate. In some embodiments, the optical waveplate may include multiple sets of the combination shown in FIG. 1 stacked together. For example, two sets of the combination shown in FIG. 1 may be stacked together to form the optical waveplate.

Figure 12:
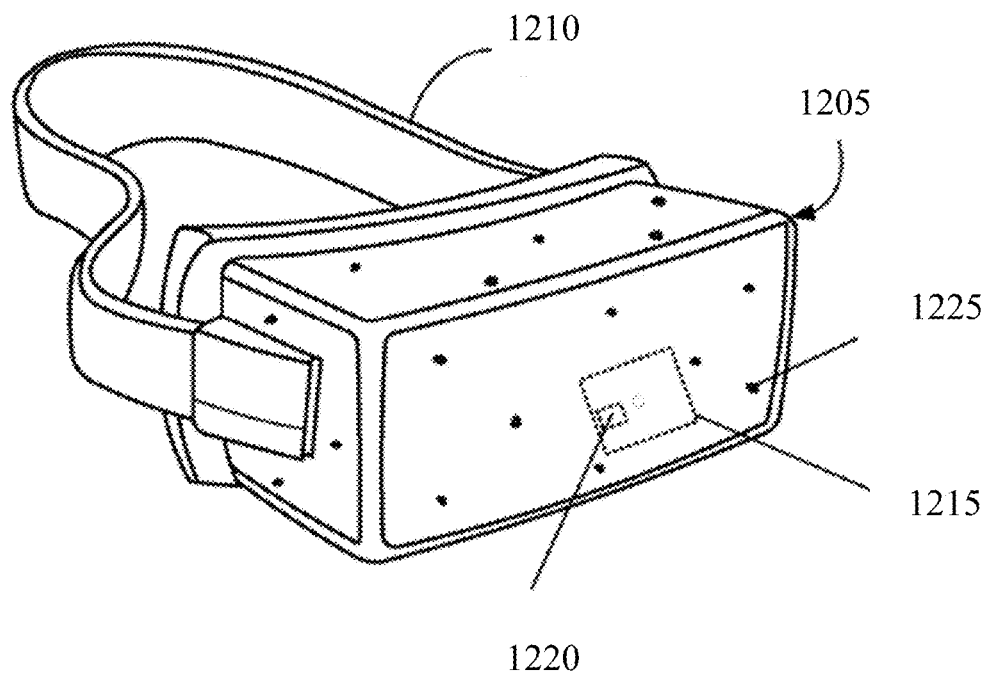
FIG. 12 illustrates a perspective view of a near-eye display ("NED") according to an embodiment of the present disclosure.
Figure 13:
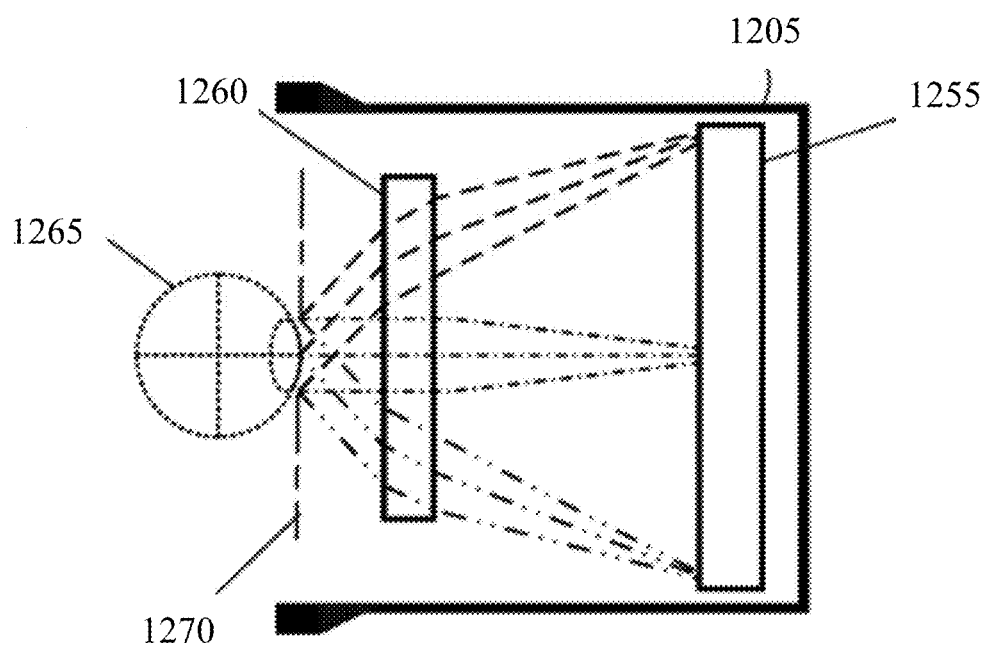
FIG. 13 illustrates a cross section of a front body of the NED shown in FIG. 12.

The disclosed optical waveplates may have a large variety of applications in many instruments and optical systems, for example, a near-eye display ("NED") for virtual-reality ("VR"), augmented-reality ("AR"), and/or mixed-reality ("MR") applications. FIG. 12 illustrates a perspective view of an NED 1200 according to an embodiment of the present disclosure. FIG. 13 illustrates a cross-section 1250 of a front body of the NED 1200 shown in FIG. 12. The NED 1200 may include one or more of the disclosed optical waveplates.

As shown in FIG. 12, the NED 1200 may include a front body 1205 and a band 1210. The front body 1205 may include one or more electronic display elements of an electronic display (not shown), an inertial measurement unit ("IMU") 1215, one or more position sensors 1220, and one or more locators 1225. In the embodiment shown by FIG. 12A, the position sensors 1220 may be located within the IMU 1215, and neither the IMU 1215 nor the position sensors 1220 may be visible to the user. The NED 1200 may function as a VR, AR, and/or MR device, or some combinations thereof. When the NED 1200 functions as an AR and/or MR device, portions of the NED 1200 and its internal components may be at least partially transparent.

As shown in FIG. 13, the front body 1205 may include an electronic display 1255 and a varifocal block 1260 that together guide an image light to an exit pupil 1270. The exit pupil 1270 may be a location of the front body 1205 where an eye 1265 of a user is positioned. In addition, the NED 1200 may include an eye-tracking system (not shown). The NED 1200 may present electronic content via the electronic display 1255 to the user of the NED 1200 at a focal distance. The varifocal block 1260 may be configured to adjust the focal distance in accordance with instructions from the NED 1200 to, e.g., mitigate vergence accommodation conflict of eyes of the user. The focal distance may be adjusted by adjusting an optical power associated with the varifocal block 1260, and specifically by adjusting the optical power associated with one or more optical lenses in the varifocal block 1260.

Figure 14:
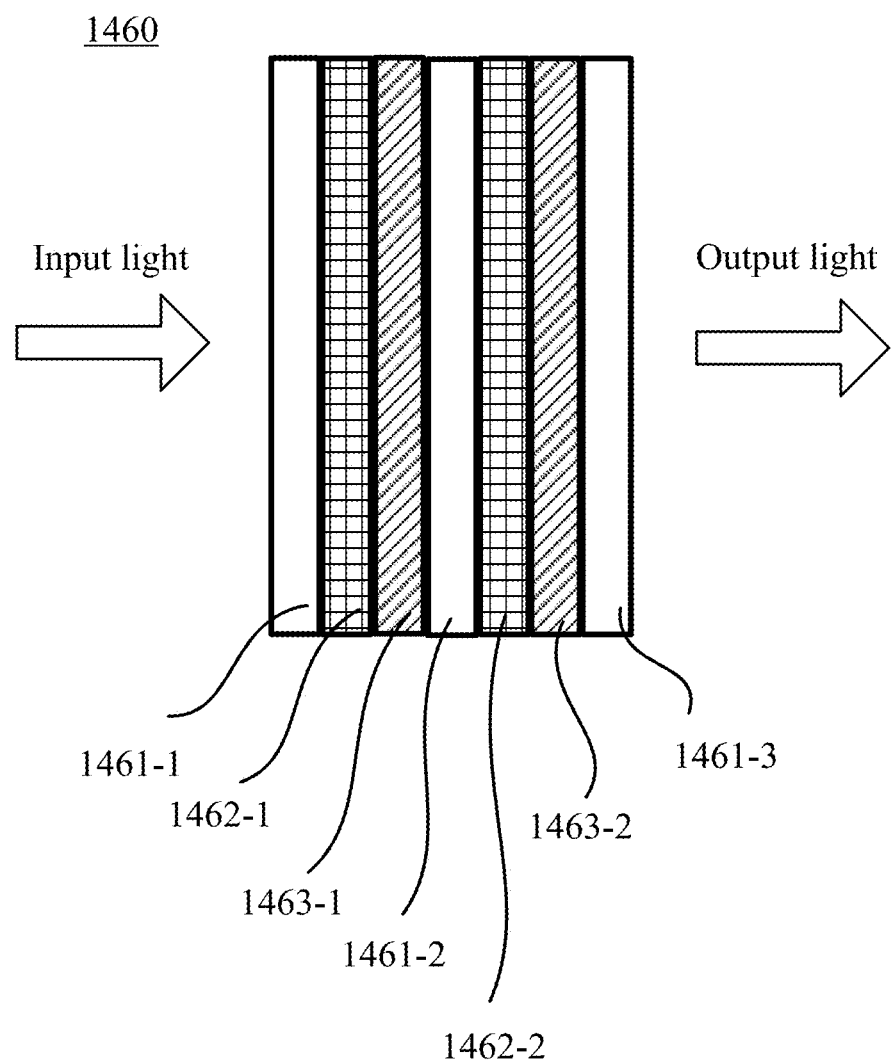
FIG. 14 illustrates a schematic diagram of a varifocal block according to an embodiment of the present disclosure.

FIG. 14 illustrates a schematic diagram of a varifocal block 1460 according to an embodiment of the present disclosure. The varifocal block 1460 may be an embodiment of the varifocal block 1260 shown in FIG. 13. In some embodiments, the varifocal block 1460 may include one or more Pancharatnam Berry Phase ("PBP") liquid crystal ("LC") lenses 1461 (e.g., 1461-1, 1461-2, and 1461-3), one or more quarter-wave plate 1462 (e.g., 1462-1 and 1462-2), and one or more switchable optical waveplate 1463 (e.g., 1463-1 and 1463-2) alternately arranged. For example, FIG. 14 shows three PBP LC lenses 1461-1, 1461-2, and 1461-3, two quarter-wave plates 1462-1 and 1462-2, and two switchable optical waveplates 1463-1 and 1463-2. The number of these optical elements are for illustrative purposes only, and may be any suitable numbers. Along the light path (e.g., from the input light to the output light), a first PBP LC lens 1461-1 may be disposed upstream of a first quarter-wave plate 1462-1, which may be disposed upstream of a first switchable optical waveplate 1463-1. The first switchable optical waveplate 1463-1 may be disposed upstream of a second PBP LC lens 1461-2, which may be disposed upstream of a second quarter-wave plate 1462-2. The second quarter-wave plate 1462-2 may be disposed upstream of a second optical waveplate 1463-2. A third PBP LC lens 1461-3 may be disposed downstream of the second optical waveplate 1463-2. This configuration may be repeated along the light path for additional times. In some embodiments, a PBP LC lens 1461 (e.g., 1461-1, 1461-2, or 1461-3) may be operated in an additive state or a focusing state (which may add an optical power to the varifocal block 1460) when receiving a right-handed circularly polarized ("RHCP") light. In some embodiments, a PBP LC lens 1461 may be operated in a subtractive state or a defocusing state (which may subtract an optical power from the varifocal block 1460) when receiving a left-handed circularly polarized ("LHCP") light. The PBB LC lens 1461 may reverse the handedness of the circularly polarized light transmitted therethrough in addition to focusing and/or defocusing the circularly polarized light.

A quarter-wave plate 1462 (e.g., 1462-1 or 1462-2) may convert the circularly polarized light transmitted through an upstream PBP LC lens 1461 to a linearly polarized light. A switchable optical waveplate 1463 (e.g., 1463-1 or 1463-2) may have a polarization axis orientated relative to the polarization direction of the linearly polarized light to convert the linearly polarized light to a left-handed circularly polarized ("LHCP") light or a right-handed circularly polarized ("RHCP") light in accordance with a switching state of the optical waveplate 1463. In some embodiments, the switchable optical waveplate 1463 may be an embodiment of the disclosed optical waveplate, such as the optical waveplate 600 shown in FIG. 6. For example, when the LC cell is switched off and switched on, the switchable optical waveplate 1463 may respectively provide a retardance of about 90° and about −90° for a broadband light (e.g., a polychromic light) covering a range of wavelengths from 400 nm to 700 nm. Accordingly, when the LC cell is switched off and switched on, the switchable optical waveplate 1463 may convert the linearly polarized light to an RHCP light and an LHCP light, respectively. In other words, the switchable optical waveplate 1463 may output an RHCP or an RHCP light in accordance with a switching state of the optical waveplate 1463, i.e., a switching state (e.g., a voltage-on state or a voltage-off state) of the LC cell in the switchable optical waveplate 1463. Thus, the first switchable optical waveplate 1463-1 placed upstream of a second PBP LC lens 1461-2 in a path of an incident light may be configured to control whether the second PBP LC lens 1461-2 functions in an additive state or in a subtractive state by controlling the handedness of the circularly polarized light incident onto the second PBP LC lens 1461-2. Likewise, the second switchable optical waveplate 1463-2 placed upstream of a third PBP LC lens 1461-3 in a path of an incident light may be configured to control whether the third PBP LC lens 1461-3 functions in an additive state or in a subtractive state by controlling the handedness of the circularly polarized light incident onto the third PBP LC lens 1461-3. Accordingly, the varifocal block 1460 may provide a range of adjustment of optical powers to adapt for human eye vergence-accommodation.

Because the disclosed optical waveplate has broadband performance, a large acceptance angle, a low residual retardance, a fast response, and a capability of being switched between different states of retardances, the varifocal block 1460 may be configured to provide various optical powers to adapt for human eye vergence-accommodation in a fast and accurate fashion over a wide range of incident angles and a wide range of incident wavelengths. The configuration of the varifocal block including the stacked PBP LC lens structure shown in FIG. 14 is merely for illustrative purposes, and other configurations of the varifocal block may be used according to various application scenarios.

The above-mentioned applications of the disclosed optical waveplates in the NEDs are merely for illustrative purposes. In addition, the disclosed optical waveplates may also be used to realize eye-tracking components, display resolution enhancement components (e.g., increasing pixel density), and pupil steering elements, etc., in a large variety of devices and systems. The disclosed optical waveplates have a broadband performance for lights with wavelengths ranging from a visible region to a near infrared region, a large acceptance angle (e.g., a large incident angle), a low residual retardance, a fast response, and a capability of being switched between, for example, a zero retardance value and a non-zero retardance value. Thus, the optical waveplates may be implemented as multifunctional optical components in the NEDs to significantly improve the optical performance of the NEDs.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical element, comprising:
a positive-C film including a liquid crystal ("LC") layer;
a positive-A film; and
a negative biaxial retardation film disposed between the positive-A film and the positive-C film,
wherein a fast axis of the positive-C film is orientated at about 35° to about 50° relative to a predetermined direction, a slow axis of the negative biaxial retardation film is orientated at about −35° to about −50° relative to the predetermined direction, and a slow axis of the positive-A film is orientated at about 35° to about 50° relative to the predetermined direction.

2. The optical element of claim 1, wherein the LC layer includes a nematic LC layer.

3. The optical element of claim 1, wherein tilt angles of LC molecules in the LC layer vary along a thickness direction of the LC layer.

4. An optical element, comprising:
a positive-C film including a liquid crystal ("LC") layer;
a positive-A film; and
a negative biaxial retardation film disposed between the positive-A film and the positive-C film,
wherein tilt angles of LC molecules in the LC layer vary along a thickness direction of the LC layer, and
wherein along the thickness direction of the LC layer, absolute values of the tilt angles of the LC molecules in the LC layer gradually increase from each of two edges of the LC layer to a center portion of the LC layer.

5. The optical element of claim 4, wherein the absolute values of the tilt angles of the LC molecules at each of the two edges of the LC layer are in a range of about 0° to about 5°, and the absolute values of the tilt angles of the LC molecules at the center portion of the LC layer are in a range of about 85° to about 90°.

6. The optical element of claim 4, wherein the two edges of the LC layer are a first edge and a second edge, the tilt angles of the LC molecules change from about +3° at the first edge to about +90° at the center portion, the tilt angles of the LC molecules change from about −3° at the second edge to about −90° at the center portion, and the tilt angles of the LC molecules change from about +90° to about −90° at the center portion.

7. The optical element of claim 1, wherein the fast axis of the positive-C film is orientated at about 45° relative to the predetermined direction, the slow axis of the negative biaxial retardation film is orientated at about −45° relative to the predetermined direction, and the slow axis of the positive-A film is orientated at about 45° relative to the predetermined direction.

8. The optical element of claim 1, further comprising an LC cell configured to be switchable between at least two predetermined states.

9. The optical element of claim 7, wherein the LC layer is a first LC layer, the LC cell further includes a second LC layer aligned in an optically compensated bend ("OCB") mode.

10. The optical element of claim 7, wherein the LC cell and the positive-A film are disposed at different sides of the positive-C film.

11. The optical element of claim 7, wherein the at least two predetermined states of the LC cell include a splay state and a homeotropic state.

12. The optical element of claim 7, wherein the positive-C film, the positive-A film, the negative biaxial retardation film, and the LC cell are oriented relative to each other in a predetermined configuration to provide an amount of phase retardance to lights in a predetermined range of wavelengths and a predetermined range of incident angles.

13. The optical element of claim 12, wherein the amount of phase retardance is substantially independent of the wavelengths in the predetermined range of wavelengths, and substantially independent of the incident angles in the predetermined range of incident angles.

14. The optical element of claim 12, wherein the positive-C film, the positive-A film, and the negative biaxial retardation film together provide more than half of the amount of the phase retardance to the lights.

15. The optical element of claim 12, wherein an alignment direction of the LC cell is orientated at about −35° to about −50° relative to the predetermined direction.

16. The optical element of claim 15, wherein the alignment direction of the LC cell is orientated at about −45° relative to the predetermined direction, the fast axis of the positive-C film is orientated at about 45° relative to the predetermined direction, the slow axis of the negative biaxial retardation film is orientated at about −45° relative to the predetermined direction, and the slow axis of the positive-A film is orientated at about 45° relative to the predetermined direction.

17. The optical element of claim 15, wherein the lights are linearly polarized lights having a polarization direction along the predetermined direction.

18. The optical element of claim 12, wherein the LC cell, the positive-C film, the negative biaxial retardation film, and the positive-A film are sequentially arranged.

19. An optical element, comprising:
a positive-C film including a liquid crystal ("LC") layer;
a positive-A film; and
a negative biaxial retardation film disposed between the positive-A film and the positive-C film,
wherein the positive-C film includes an LC material with a negative dielectric anisotropy.

20. The optical element of claim 19, wherein a fast axis of the positive-C film is orientated at about 35° to about 50° relative to a predetermined direction, a slow axis of the negative biaxial retardation film is orientated at about −35° to about −50° relative to the predetermined direction, and a slow axis of the positive-A film is orientated at about 35° to about 50° relative to the predetermined direction.

* * * * *